O. BARTEL.
VALVE MECHANISM.
APPLICATION FILED OCT. 22, 1908.

914,913.

Patented Mar. 9, 1909.

WITNESSES:
William Miller
Christian Almstaedt

INVENTOR
Otto Bartel
BY
W. C. Hauff
ATTORNEY

UNITED STATES PATENT OFFICE.

OTTO BARTEL, OF NEW YORK, N. Y.

VALVE MECHANISM.

No. 914,913.  Specification of Letters Patent.  Patented March 9, 1909.

Application filed October 22, 1908. Serial No. 459,052.

*To all whom it may concern:*

Be it known that I, OTTO BARTEL, a citizen of the United States, residing at New York, in the county of New York and State of New York, have invented new and useful Improvements in Valve Mechanism, of which the following is a specification.

Figure 1:
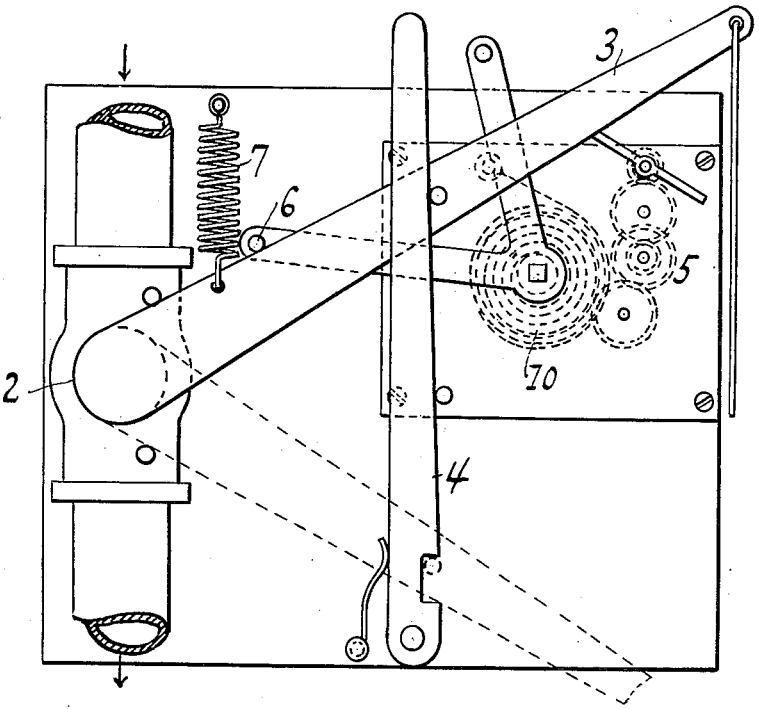
Figure 2:
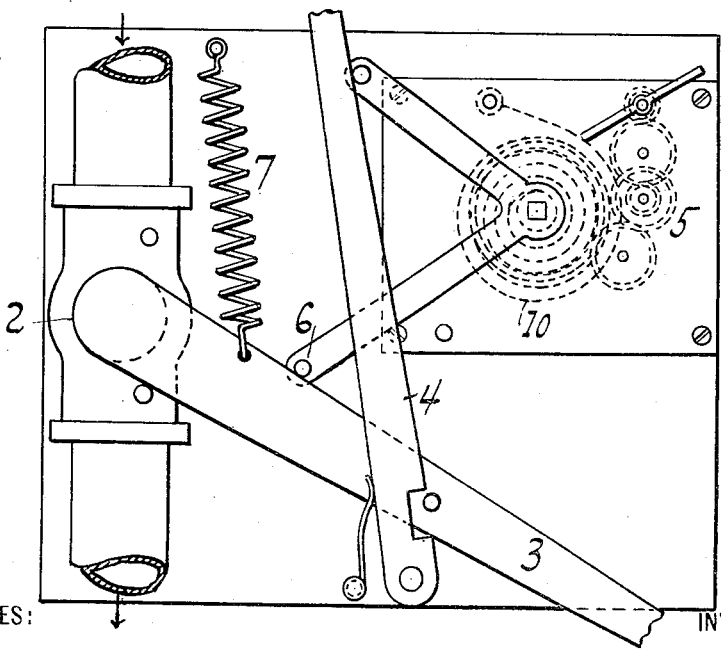

This invention relates to a valve mechanism and the invention resides in certain details of construction set forth in the following specification and claims and illustrated in the annexed drawing in which:

Figure 1 shows mechanism embodying this invention in valve closing position. Fig. 2 shows the mechanism of Fig. 1 in position to open the valve.

In this drawing is shown a valve 2 with lever 3 for operating the valve. The valve can be operated by pull on a chain or handle on the lever so that the lever forms opening and closing means for the valve. Suitable restoring means 7 are provided to return the lever and close the valve.

A catch 4 is provided to hold the lever 3 with the valve temporarily open or retracted. Said catch or its shoulder part springs to engagement with the lever or a pin thereon when the lever is actuated.

A speed regulator or escapement movement is indicated at 5 having a bell crank lever 6 an arm of which can engage catch 4 to free the same for lever 3 to return or close the valve. The speed regulator is actuated by a suitable motor 10 applied at a suitable point and which motor is put into tension or active position as lever 3 returns.

As lever 3 is moved to open the valve the catch 4 engages this lever. As the speed regulator moves bell crank lever 6 an arm thereof engages the catch to free the latter and the lever 3 begins to return and at the same time the returning lever 3 returns the bell crank lever 6 to reset or rewind the motor of the speed regulator.

The motor or spring 7 of lever 3 is sufficiently powerful to overcome the motor of the speed regulator or to rewind the motor 10 of the same as the lever 3 returns. After the flow of water has been started by the actuation of the lever 3 the flow is continued for a time and then is automatically stopped to allow cleansing but avoid waste of water.

What I claim is:—

1. A valve with valve operating lever and restoring means for the lever to hold the valve in closed position, a catch for the lever and a speed regulator adapted to be engaged by the valve operating lever and provided with actuating means of less energy than the restoring means of the valve operating lever so as to allow the speed regulator to be set by the valve operating lever, said catch adapted to be engaged by the speed regulator.

2. A valve with opening and closing means, a catch for said valve operating means, and a speed regulator with operating means, said valve operating means being made to engage the speed regulator and return the same to starting position.

In testimony whereof I have hereunto set my hand in the presence of two subscribing witnesses.

OTTO BARTEL.

Witnesses:
 EDWARD WIESNER,
 CHRISTIAN ALMSTAEDT.